(12) United States Patent
Becker

(10) Patent No.: US 12,548,474 B2
(45) Date of Patent: Feb. 10, 2026

(54) LABEL WITH STAND-UP MECHANISM

(71) Applicant: Schreiner Group GmbH & Co. KG, Oberschleißheim (DE)

(72) Inventor: Johannes Becker, Ilmmünster (DE)

(73) Assignee: Schreiner Group GmbH & Co. KG, Oberschleißheim (DE)

(*) Notice: Subject to any disclaimer, the term of this patent is extended or adjusted under 35 U.S.C. 154(b) by 37 days.

(21) Appl. No.: 18/687,896

(22) PCT Filed: Aug. 3, 2022

(86) PCT No.: PCT/EP2022/071788
§ 371 (c)(1),
(2) Date: Feb. 29, 2024

(87) PCT Pub. No.: WO2023/036522
PCT Pub. Date: Mar. 16, 2023

(65) Prior Publication Data
US 2025/0014483 A1  Jan. 9, 2025

(30) Foreign Application Priority Data
Sep. 7, 2021 (DE) ............ 10 2021 123 104.3

(51) Int. Cl.
  *G09F 3/00* (2006.01)
  *G06K 19/077* (2006.01)
  *G09F 3/02* (2006.01)

(52) U.S. Cl.
  CPC ..... *G09F 3/0289* (2013.01); *G06K 19/07798* (2013.01); *G09F 2003/023* (2013.01); *G09F 2003/0264* (2013.01)

(58) Field of Classification Search
  CPC ............ G09F 3/0289; G09F 2003/023; G09F 2003/0264; G09F 3/02886; G09F 3/0297; G09F 3/02; G06K 19/07798; G06K 19/0776; G06K 19/07771
  See application file for complete search history.

(56) References Cited

U.S. PATENT DOCUMENTS

| | | | |
|---|---|---|---|
| 7,508,347 B2* | 3/2009 | Sakama | G06K 19/07745 343/700 MS |
| 10,803,372 B2* | 10/2020 | Ramzan | G06K 19/07718 |
| 2008/0055089 A1 | 3/2008 | Gustafsson | |

FOREIGN PATENT DOCUMENTS

| | | |
|---|---|---|
| DE | 100 17 142 A1 | 10/2001 |
| DE | 20 2004 021 025 U1 | 7/2006 |
| DE | 20 2006 009 584 U1 | 7/2007 |

(Continued)

OTHER PUBLICATIONS

International Search Report in PCT/EP2022/071788, mailed Nov. 21, 2022.

(Continued)

*Primary Examiner* — Patricia L. Nordmeyer
(74) *Attorney, Agent, or Firm* — Collard & Roe, P.C.

(57) ABSTRACT

A label with a stand-up mechanism includes a base part which has an adhesive coating on its underside for adhering the label to a substrate, and a stand-up part which is connected in one piece to the base part and is configured in such a way that the stand-up part can be set up at an angle greater than 0° to the base part by folding along a stand-up line. The stand-up part has a stand-up foot for setting up the stand-up part at the angle to the base part.

14 Claims, 12 Drawing Sheets

(56) References Cited

FOREIGN PATENT DOCUMENTS

| | | |
|---|---|---|
| DE | 20 2010 001 818 U1 | 4/2010 |
| DE | 10 2014 102 296 A1 | 8/2015 |
| EP | 1 275 083 B1 | 8/2004 |
| EP | 1 632 926 B1 | 2/2008 |
| JP | 2018-128775 A | 8/2018 |
| TW | 201342248 A | 10/2013 |

OTHER PUBLICATIONS

German Search Report dated Apr. 5, 2022 in German Application No. 10 2021 123 104.3, with English translation of the relevant parts.

\* cited by examiner

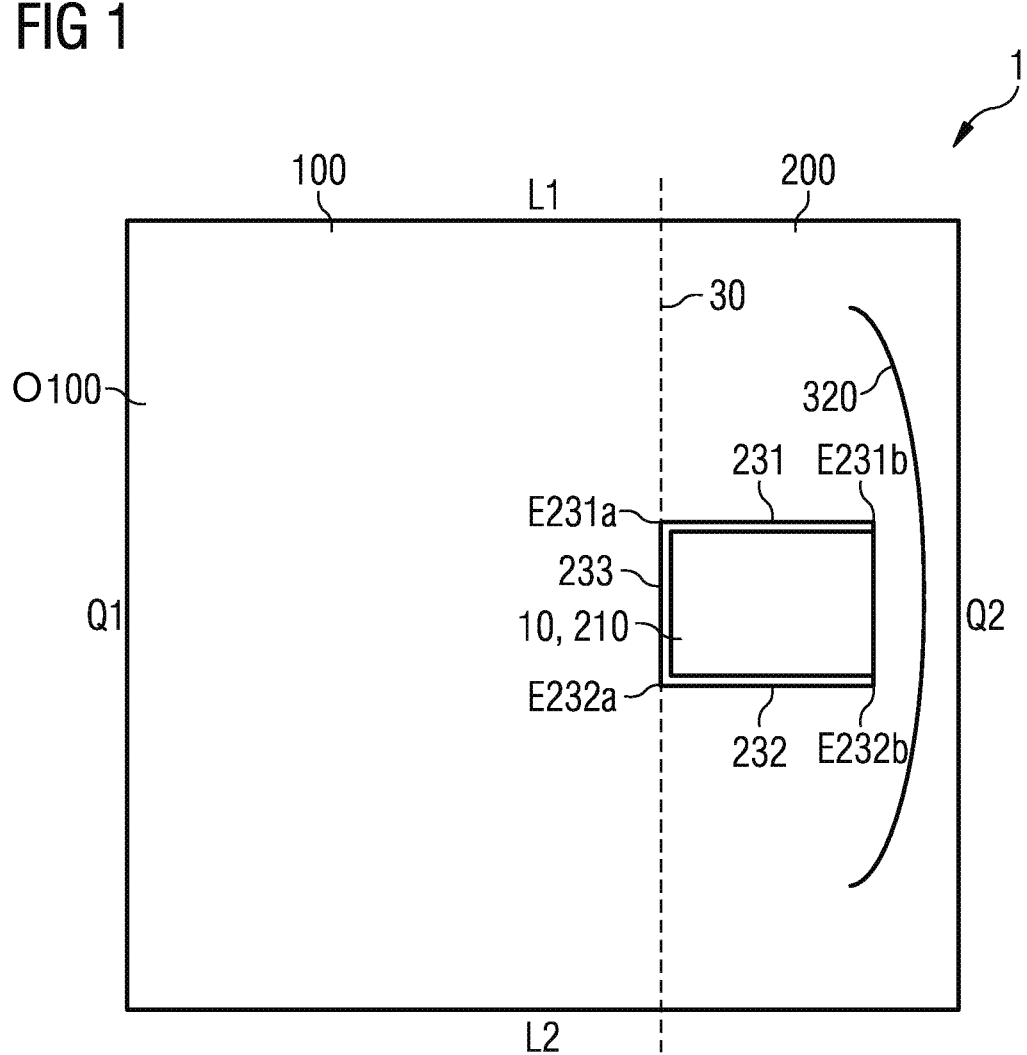

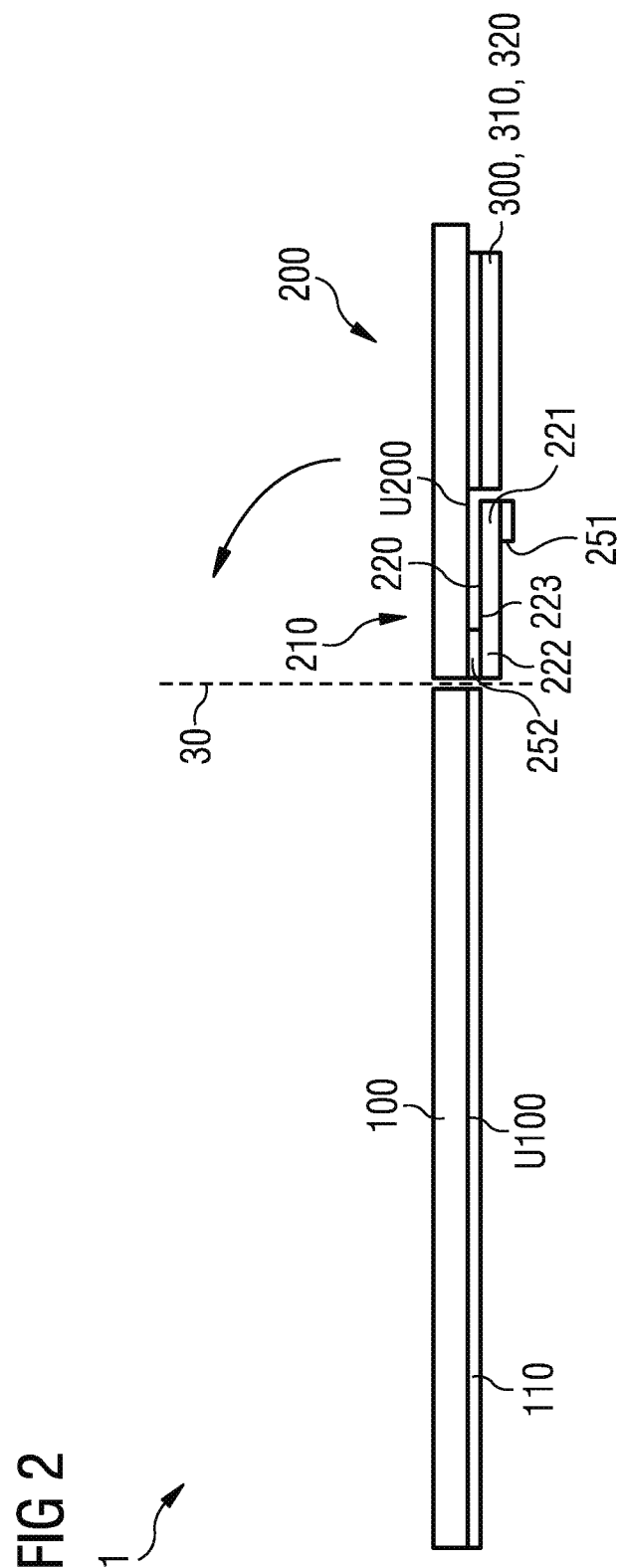

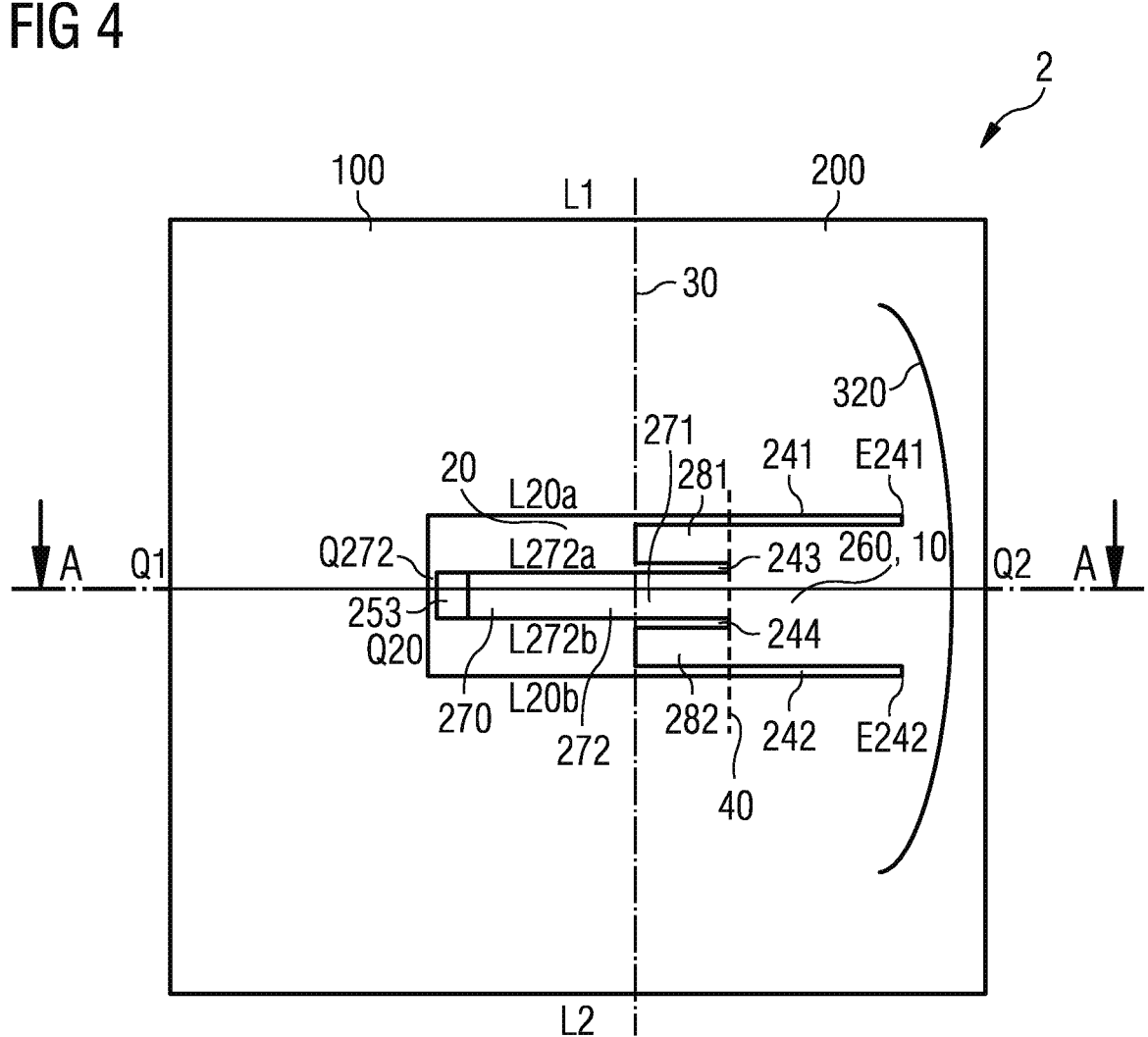

LABEL WITH STAND-UP MECHANISM

CROSS REFERENCE TO RELATED APPLICATIONS

This application is the National Stage of PCT/EP2022/071788 filed on Aug. 3, 2022, which claims priority under 35 U.S.C. § 119 of German Application No. 10 2021 123 104.3 filed on Sep. 7, 2021, the disclosure of which is incorporated by reference. The international application under PCT article 21(2) was not published in English.

BACKGROUND OF THE INVENTION

1. Field of the Invention

The invention relates to a label with a stand-up mechanism for standing up an antenna structure away from a substrate, for example in the case of a radio frequency identification (RFID) label.

2. Description of the Related Art

RFID labels enable the electronic storage and wireless transmission of product information from products to which the labels are affixed. An RFID label usually has a so-called RFID inlay, which comprises an RFID chip (microchip) and an antenna structure that is connected to the RFID chip. The RFID inlay is arranged on a carrier substrate that can be applied to an object to be labeled using an adhesive coating. Particularly in the case of objects with a conductive surface, it is necessary for the portion of the label that carries the antenna structure to be positioned and aligned away from the conductive surface in order to enable undisturbed data communication between the RFID chip and a receiver.

SUMMARY OF THE INVENTION

An object of the present invention is to provide a label having a stand-up mechanism that enables a portion of the label to be positioned at a distance from a surface of an object to which the label is applied.

A label with stand-up mechanism that allows a portion of the label to be positioned at a distance from the surface of a substrate in an easy way and yet to be held securely in the stand-up position is specified in patent claim 1.

The label with stand-up mechanism comprises a base part which has an adhesive coating on its underside for adhering the label to a substrate. Furthermore, the label comprises a stand-up part which is connected in one piece to the base part and is configured in such a way that the stand-up part can be set up at an angle greater than 0° to the base part by folding along a stand-up line. The stand-up part has a stand-up foot for setting up the stand-up part at the angle to the base part.

In particular, the label can be equipped with RFID functionality, whereby the non-adhesive stand-up part of the label can carry an antenna structure of an RFID inlay. The stand-up mechanism allows the antenna-carrying stand-up part of the label to be positioned opposite the surface to be labeled.

According to possible embodiments of the label, the stand-up part has a pulling element for folding out the stand-up foot from a plane of the stand-up part. In these embodiments of the label, the actual stand-up mechanism comprises the stand-up foot, which can be configured as a punched-out tab in the area of the stand-up part, and the pulling element. The pulling element is configured in such a way that the stand-up foot is folded out of the plane of the stand-up part and sets up the stand-up part at an angle greater than 0° to the base part when the stand-up part is lifted. The antenna-carrying stand-up part can be securely fixed in a perpendicular position to the adhered base part, for example at an angle of 90° to the base part, or at an angle to the base part, for example at an angle of less than 90° to 60°, or over-extended to the base part, for example at an angle greater than 90° to 120°.

According to a first possible embodiment of the label with pulling element, a first punched-out region is only provided in the portion of the stand-up part, which forms the stand-up foot. The pulling element is arranged on an underside of the stand-up foot. The pulling element can be adhered to the stand-up foot at a region close to the stand-up line. An adhesive layer can be arranged on a further region/end region on the underside of the pulling element.

To attach the label to an object, the label is adhered to a substrate using the adhesive coating on the underside of the base part. The adhesive coating on the underside of the end region of the pulling element can also be used to attach the pulling element to the substrate. When the stand-up part is lifted, the pulling element now pulls the stand-up foot out of the plane of the stand-up part so that the stand-up part can be securely fixed in an inclined or upright/vertical or over-stretched position in relation to the base part with the help of the folded-out stand-up foot.

According to a second possible embodiment of the label with pulling element, a first punched-out region, which forms the stand-up foot, is provided in the stand-up part and a second punched-out region is provided in the base part. The pulling element is configured as a strip-shaped section that extends from the stand-up foot in the first punched-out region into the second punched-out region of the base part. An adhesive layer is arranged on an upper side of an end section of the pulling element, which is arranged opposite the adhesive-coated underside of the base part.

The adhesive-coated end section of the pulling element is folded over onto the underside of the label, in particular the underside of the stand-up part, by folding the pulling element along a crease line that separates the stand-up foot from the rest of the stand-up part. The pulling element is folded over at the crease line onto the underside of the stand-up part before the label is adhered to a substrate.

In the second embodiment of the label with pulling element, the label can also be adhered to an object to be labeled with the adhesive-coated underside of the base part. At the same time, the folded-down pull element also adheres to the object to be labeled with its adhesive-coated end section.

When setting up the stand-up part, the pulling element pulls the punched-out stand-up foot out of the plane of the stand-up part, so that also in this second embodiment the stand-up part can be aligned in an inclined or vertical or over-extended position in relation to the base part and fixed at a safe distance from the surface.

According to a simplified embodiment of a label with a stand-up mechanism, no pulling element is provided on the stand-up part. The stand-up line is located at the lower area of the stand-up part, where the stand-up part adjoins the base part. The stand-up line can be configured as a crease or fold line. The crease or fold line can be configured as a groove or slit/perforation in the material of the stand-up part. The stand-up foot is formed by a large number of support elements. To form the support elements, a large number of punchings are provided in the lower area of the stand-up part, which are arranged next to each other along the stand-up line or crease/fold line. The positioning of the punchings relative to the course of the stand-up line and the size/depth of the punchings determine the later stand-up angle of the stand-up part.

In the various embodiments mentioned above, with or without a pulling element, the label provides a simple, inexpensive and yet reliable concept for positioning the stand-up part as a protruding flag at a distance from a substrate to which the label is affixed. The label is characterized by a high degree of mechanical flexibility and can therefore be affixed to flat as well as curved/round surfaces. Furthermore, the label with the base part offers a large available area for print information. In the RFID label design, the pulling element enables the stand-up foot to be folded out securely so that an antenna structure of the RFID label, which can be arranged on the stand-up part, can be positioned at a distance from a metallic surface and securely fixed.

The principle presented is not limited to RFID labels. In principle, the concept can also be suitable for labels with other fields of application in which a stand-up part is intended to protrude as a flag from a surface to which the label is affixed.

BRIEF DESCRIPTION OF THE DRAWINGS

The invention is explained in more detail below with reference to figures showing embodiments of the label with the stand-up mechanism.

FIG. 1 shows a top view on the upper side of a label with stand-up mechanism in the form of a stand-up foot and a pulling element in a flat-lying state, FIG. 2 shows a cross-section of an embodiment of a label with a stand-up mechanism in the form of a stand-up foot and a pulling element in the flat-lying state, FIG. 4 shows a top view of a further embodiment of a label with an stand-up mechanism in the form of a stand-up foot and a pulling element in a flat-lying state.

DETAILED DESCRIPTION OF THE PREFERRED EMBODIMENTS

Figure 3A:
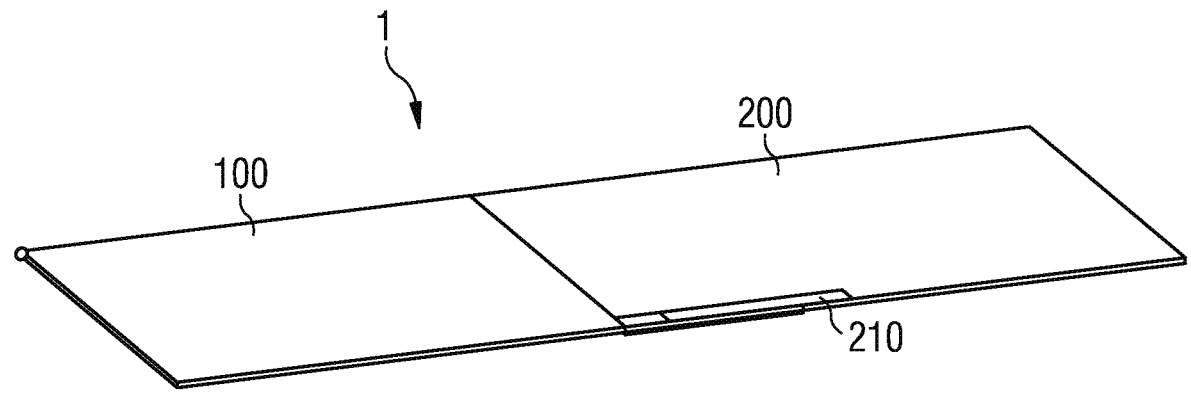
FIGS. 3A to 3D shows setting-up of the stand-up part of the label by means of the stand-up foot and the pulling element, starting from a flat-lying state of the label via an inclined position of the stand-up part to a vertical position of the stand-up part up to an over-extended position of the stand-up part.

A first embodiment of the label with a stand-up mechanism is described below with reference to FIGS. 1 and 2, wherein FIG. 1 shows a top view of the upper side O100 of the first embodiment of the label and FIG. 2 shows a cross-section through the label 1.

The label 1 with stand-up mechanism comprises a base part 100, which has an adhesive coating 110 on its underside U100 for adhering the label 1 to a substrate. The label 1 also comprises a stand-up part 200, which is connected in one piece to the base part 100. In contrast to the base part 100, the stand-up part 200 is non-adhesive or weakly adhesive on the underside. For example, the underside of the stand-up part 200 may have no adhesive coating or may be coated with an adhesive that is covered by an adhesive killer.

The stand-up part 200 is configured such that the stand-up part can be set up by folding along a stand-up line/fold line 30 at an angle greater than 0° to the base part. The stand-up line/fold line 30 can run parallel to a first transverse side Q1 and a second transverse side Q2 of the label and perpendicular to a first longitudinal side L1 and a second longitudinal side L2 of the label. Other arrangements of the stand-up line/fold line 30 are possible. The stand-up line/fold line 30 is located between the base part 100, which is configured to be adhesive on its underside, and the stand-up part 200, which is configured to be non-adhesive.

The stand-up part 200 has a stand-up foot 210 for standing up and aligning the stand-up part 200 at an angle to the base part 100. The stand-up part 200 also has a pulling element 220 for folding out the stand-up foot 210 from a plane of the stand-up part 200.

The stand-up foot 210 is formed as an area punched out of the material of the stand-up part 200. For providing the stand-up foot 210 in the stand-up part 200, a first punching line 231 and a second punching line 232 are arranged in a material of the stand-up part 200. The stand-up foot 210 is formed in an area of the stand-up part 200 between the first punching line 231 and the second punching line 232.

The first punching line 231 and the second punching line 232 are arranged at a distance from one another in the material of the stand-up part 200. The two punching lines 231 and 232 each extend from the stand-up line/fold line 30 into the material of the stand-up part 200. As can be seen in FIG. 1, the two punching lines 231 and 232 can run parallel to each other and at a distance parallel to the longitudinal sides L1 and L2 of the label 1.

Furthermore, the first and second punching lines 231, 232 can be arranged in such a way that they run at a right angle to the stand-up line/fold line 30. The first and second punching lines 231, 232 have the same length.

The stand-up foot 210 is separated from a material of the base part 100 by a third punching line 233, which extends along a section, for example a middle section, of the stand-up line/fold line 30. As can be seen in FIG. 1, the third punching line 233 extends along a section of the stand-up line/fold line 30 between a first end E231a of the first punching line 231 and an end E232a of the second punching line 232. The respective first end E231a, E232a of the first and second punching lines 231, 232 ends at the stand-up line/fold line 30.

The stand-up foot 210 can be formed as a region 10 punched out of a material of the stand-up part 200, which is connected on one side to the material of the stand-up part 200. The stand-up foot 210 can, for example, be formed as a rectangular area in the stand-up part 200, as shown in FIG. 1. The stand-up foot 210 is connected to the material of the stand-up part 200 on a side opposite the stand-up line/fold line 30 or the third punching line 233.

The first and second punching lines 231, 232 extend from the stand-up line/fold line 30 and in particular from a first and second end of the third punching line 233 or from the respective first E231a, E232a of the first and second punching lines in the direction of the transverse side Q2 into the material of the stand-up part 200. The first and second punching lines 231, 232 have a respective second end E231b and E232b, which is located at a distance from the second transverse side Q2 of the label 1. The first and second punching lines 231, 232 thus end in the material of the stand-up part 200 at a distance from the second transverse side Q2 of the label 1. This means that no punching line extends between the respective second end E231b and E232b of the first and second punching lines 231, 232, so that the stand-up foot 210 is connected to the stand-up part 200. The stand-up foot is thus configured as a fold-out tab in the stand-up part 200, which can be folded out of the stand-up part 200 at a crease line between the two ends E231b and E232b.

As can be seen in FIG. 2, the pulling element 220 is arranged on an underside U200 of the stand-up part 200. The pulling element 220 has on its underside on a first section 221, in particular an end section, an adhesive layer 251 for adhering the pulling element 220 to a substrate to which the label is to be adhered. The underside of the pulling element 220 is the side facing away from the stand-up foot 210.

The pulling element 220 has a further adhesive layer 252 on a second section 222 on its upper side for adhering the pulling element 220 to the stand-up foot 210. The upper side of the pulling element 220 is the side facing the stand-up foot 210. The second section 222 of the pulling element 220 is an end portion of the pulling element, which is located adjacent to the stand-up line/fold line 30 and at a distance from the first end portion 221 of the pulling element.

The pulling element 220 has a third section 223, which is arranged between the first section 221 and the second section 222 of the pulling element. The third section 223 of the pulling element 220 is non-adhesive on the upper side and the lower side.

FIGS. 1 and 2 show an embodiment of the label 1 with an RFID function. The label comprises an RFID inlay 300, which has an RFID chip 310 and an antenna 320. The antenna 320 is connected to the RFID chip 310. The RFID chip 310 and in particular the antenna 320 are arranged on the stand-up part 200.

As shown in FIG. 2, the RFID inlay 300 can be arranged on the underside U200 of the stand-up part 200. In particular, the RFID inlay 300 can be arranged in an area of the stand-up part 200 between the stand-up foot 210 and the second transverse side Q2 of the label 1. If the RFID inlay 300 is arranged on the underside U200 of the stand-up part, the pulling element 220 can be arranged on the underside U200 of the stand-up part 200 or stand-up foot 210 in such a way that the first end section 221 of the pulling element 220 is adjacent to the RFID inlay 300.

FIGS. 3A to 3D illustrate the stand-up mechanism of the label 1, which enables the stand-up part 200 to be set up securely at an angle to the base part 100 and thus to a substrate to which the base part 100 is adhered. The pulling element 220 is configured in such a way that the stand-up foot 210 is folded out of the plane of the stand-up part 200 when the pulling element 220 is adhered to the substrate by adhesive layer 251, and the stand-up part 200 is set up by folding along the stand-up line 30.

Figure 3B:
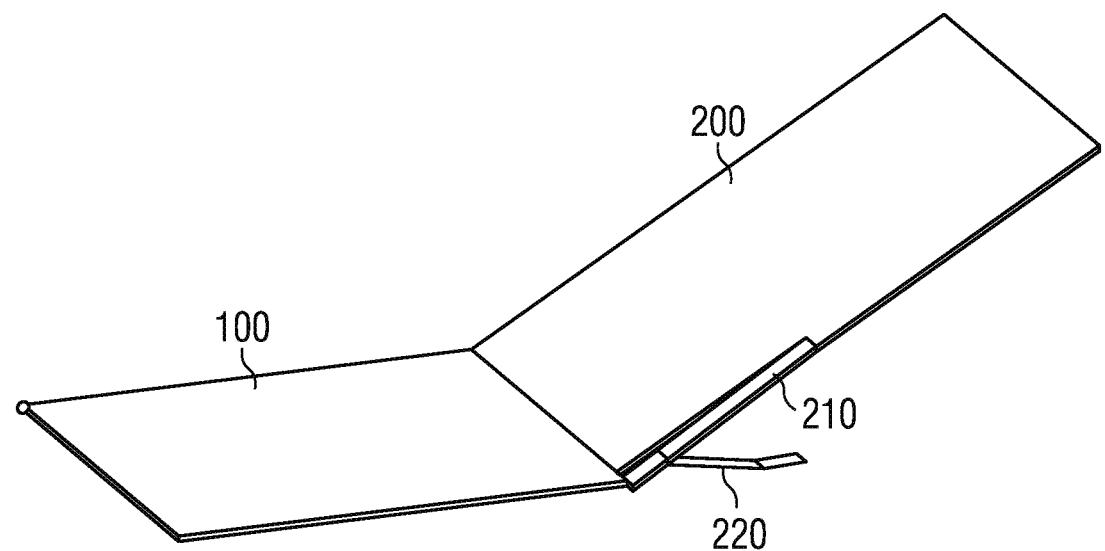
Figure 3C:
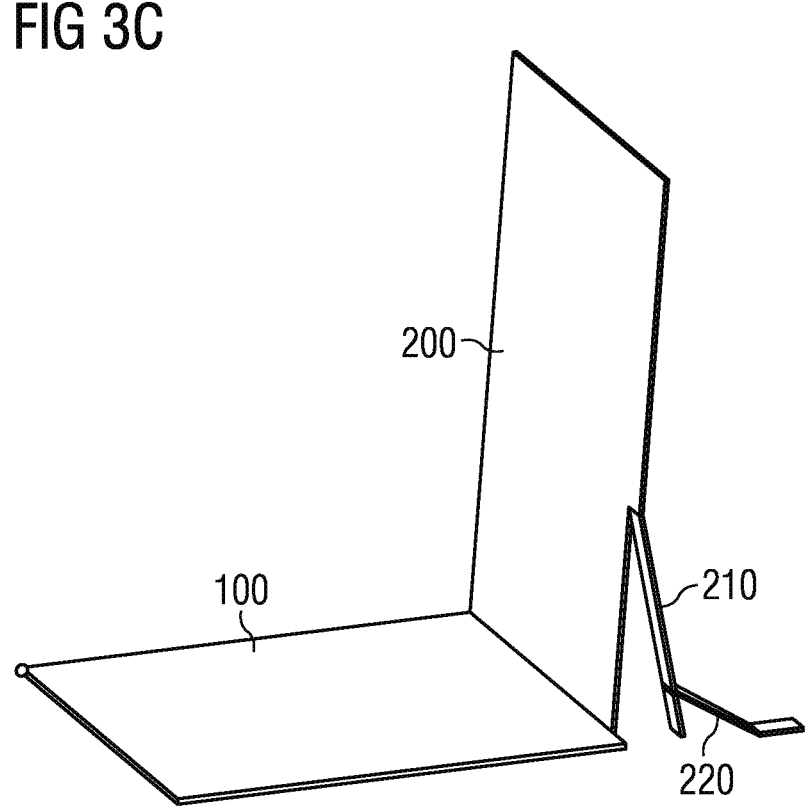

FIG. 3A shows the label 1 after the base part 100 with the adhesive coating 110 on the underside has been adhered to a substrate. The pulling element also adheres to the substrate with the adhesive layer 251. When the stand-up part 200 is lifted, the pulling element 220 gradually pulls the stand-up foot 210 out of the plane of the stand-up part 200 (FIG. 3B). When the stand-up part 200 has been raised to the vertical position, i.e. at an angle of approximately 90° to the base part 100 and thus to the substrate, the stand-up foot 210 has been folded so far out of the plane of the stand-up part 200 by the pulling element 220 that the stand-up foot provides a secure support for the stand-up part 200. It is therefore no longer possible for the stand-up part 200 to fold back into the horizontal position on its own. Instead, the stand-up part 200 is securely fixed in the vertical position by the stand-up foot 210 (FIG. 3C).

By extending the pulling element 220 beyond the vertical of the stand-up foot, the stand-up foot 210 slides into a new position from which the stand-up part 200 no longer returns to the initial position and thus, in the case of an RFID label, fixes the antenna part 320 in an upright position. When the stand-up part 200 is over-extended, the stand-up foot 210 lifts off the ground. At the same time, the middle section 223 of the pulling element 220 is also raised further and forms an extended support for the stand-up foot, so that the stand-up part 200 can also be held securely in an over-extended position (FIG. 3D).

Figure 3D:
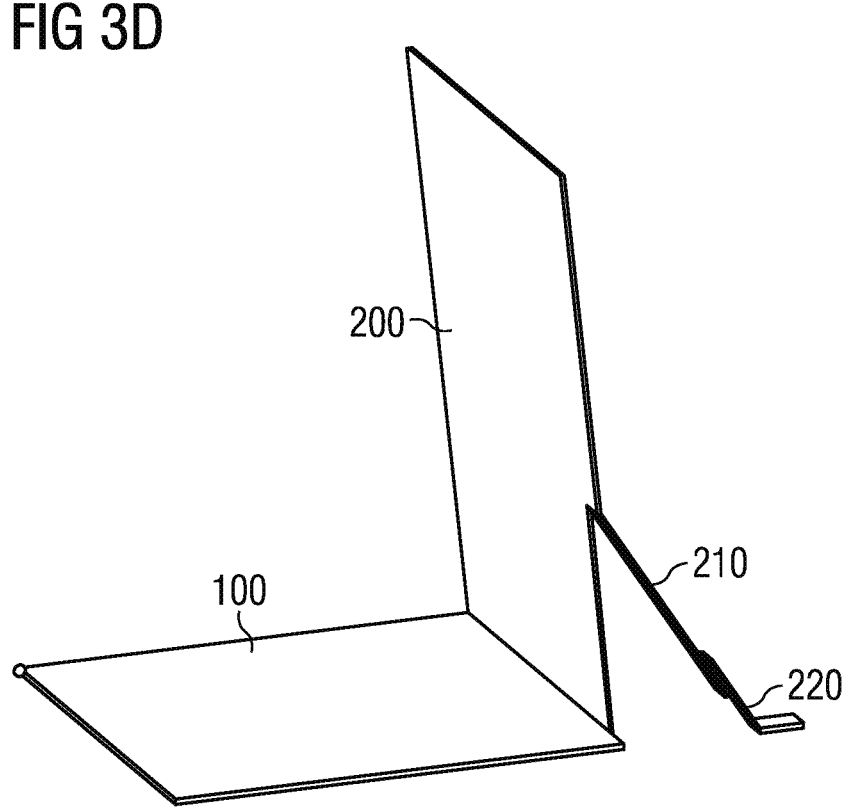

As can be seen from FIG. 3D, the pulling element 220 also acts as a limitation against excessive movement of the stand-up part in the direction of the stand-up movement. Due to this effect and the stand-up foot, the possible angle of the stand-up part and thus, in the case of an RFID tag, the possible angle of the antenna 320 is severely restricted, which ensures good RFID functionality.

Figure 5:
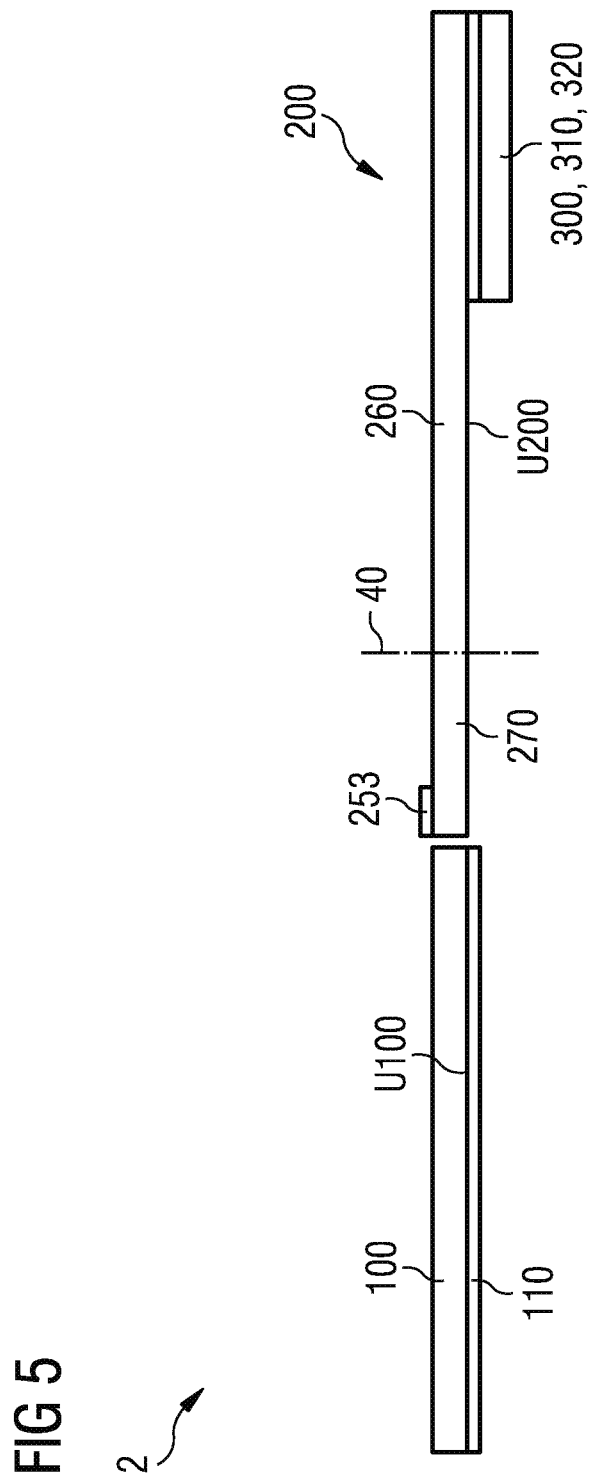
FIG. 5 shows a cross-section of the further embodiment of the label with a stand-up mechanism in the form of a stand-up foot and a pulling element in a flat-lying state.

A second embodiment of the label with a stand-up mechanism is described below with reference to the label 2 shown in FIGS. 4 and 5. FIG. 4 shows a top view on the second embodiment of the label 2 with a stand-up mechanism in a flat position of the label. FIG. 5 shows a cross-section of the second embodiment of the label 2.

Similar to the first embodiment, the second embodiment of the label 2 also comprises a base part 100, which has an adhesive coating 110 on its underside U100 for adhering the label 2 to a substrate. Furthermore, the label 2 comprises a stand-up part 200, which is connected in one piece to the base part 100 and is non-adhesive or weakly adhesive on the underside. For example, the underside of the stand-up part 200 may have no adhesive coating or may be coated with an adhesive killer, that is covered by an adhesive killer.

In the second embodiment of the label 2, the stand-up part 200 is also configured such that the stand-up part can be set up by folding along a stand-up line/fold line 30 at an angle greater than 0° to the base part 100. The stand-up line/fold line 30 can run parallel to a first transverse side Q1 and a second transverse side Q2 of the label and perpendicular to a first longitudinal side L1 and a second longitudinal side L2 of the label. Other arrangements of the stand-up line/fold line 30 are possible. The stand-up line/fold line 30 is located between the base part 100 and the non-adhesive stand-up part 200.

The stand-up part 200 has a stand-up foot 260 for setting up the stand-up part 200 at an angle to the base part 100. In addition, the stand-up part 200 has a pulling element 270 for folding out the stand-up foot 260 from a plane of the stand-up part 200.

The stand-up foot 260 is formed as a first region punched out of the material of the stand-up part 200. To form the stand-up foot 260, a first punching line 241 and a second punching line 242 are arranged in a material of the stand-up part 200. The stand-up foot 260 is formed in a region of the stand-up part 200 between the first punching line 241 and the second punching line 242. The first and second punching lines 241, 242 are arranged at a distance from one another in the material of the stand-up part 200 and extend from the stand-up line/fold line 30 into the material of the stand-up part 200.

As can be seen in FIG. 4, the two punching lines 241 and 242 run parallel to each other and at a distance parallel to the longitudinal sides L1, L2 of the label 2. The first and second punching lines 241, 242 extend from the stand-up line/fold line 30 into the material of the stand-up part 200 in such a way that an end E241 of the first punching line 241 and an end E242 of the second punching line are arranged at a distance from the second transverse side Q2 of the label 2. The first and second punching lines 241, 242 thus end in the material of the stand-up part 200 at a distance from the second transverse side Q2 of the label 2. No punching line runs between the two ends E241 and E242 of the two punching lines 241, 242.

The second embodiment of the label 2 has, in addition to the punched-out first region 10, which forms the stand-up foot, a punched-out second region 20, which is arranged in the material of the base part 100. The punched-out second region 20 has a first longitudinal side L20a, which extends into the material of the base part 100 as an extension of the first punching line 241 starting from the stand-up line/fold line 30. In addition, the punched-out second region 20 has a second longitudinal side L20b, which extends in the extension of the second punching line 242 starting from the stand-up line/fold line 30 into the material of the base part 100. The punched-out second region 20 has a transverse side Q20, which is arranged at a distance from the first transverse side Q1 of the label. The transverse side Q20 can, for example, run parallel to the transverse side Q1 of the label.

The stand-up part 200 has a third punching line 243, which extends into the material of the stand-up part 200 starting from the stand-up line/fold line 30 and at a distance from the first punching line 241. In addition, the stand-up part 200 has a fourth punching line 244, which extends into the material of the stand-up part 200 starting from the stand-up line/fold line 30 and at a distance from the second punching line 242. The third and fourth punching lines 243, 244 are arranged at a distance from one another.

As can be seen in FIG. 4, the third punching line 243 runs parallel to the first punching line 241, the third punching line 243 being shorter than the first punching line 241. The fourth punching line 244 runs parallel to the second punching line 242, the fourth punching line 244 being shorter than the second punching line 242. The first and second punching lines 241, 242 are of equal length. Likewise, the third and fourth punching lines have the same length.

The pulling element 270 has a first section 271, which is arranged in the stand-up part 200 between the third and fourth punching lines 243, 244. Furthermore, the pulling element 270 has a second section 272, which is arranged in the punched-out second region 20 of the base part 100. The second section 272 of the pulling element 270 has a first longitudinal side L272a, which extends into the material of the base part 100 in extension of the third punching line 243 starting from the stand-up line/fold line 30. Furthermore, the second section 272 of the pulling element 270 has a second longitudinal side L272b, which extends into the material of the base part 100 in extension of the fourth punching line 244, starting from the stand-up line/fold line 30. In addition, the second section 272 of the pulling element 270 has a transverse side Q272 which is arranged at a distance from the transverse side Q20 of the second punched-out region 20.

The second section 272 of the pulling element 270 can be separated from the remaining material of the base part 100 by a punching. In particular, the first longitudinal side L272a of the pulling element is separated from the longitudinal side L20a by a punching and the second longitudinal side L272b of the pulling element is separated from the longitudinal side L20b of the punched-out second region 20. The transverse side Q272 of the pulling element 270 can be separated from the transverse side Q20 of the punched-out second region by a punching line.

The second portion 272 of the pulling element 270 has an adhesive layer 253 for adhering the pulling element 270 to a substrate at an area on its upper surface facing away from the lower surface U100 of the base part 100. The region of the pulling element 270, on the upper side of which the adhesive layer 253 is arranged, extends from the transverse side Q272 of the pulling element 270 to a distance away from the stand-up line/fold line 30.

The adhesive layer 253 can, for example, be arranged on an end region of the pulling element 270.

In an embodiment of the label 2 with an RFID function, the label has an RFID inlay 300 comprising an RFID chip 310 and an antenna 320. The antenna 320 is connected to the RFID chip 310. The RFID inlay is arranged on the stand-up part 200. As shown in FIG. 5, the RFID inlay can be arranged on an underside U200 of the stand-up part 200 between the stand-up foot 260 and the second transverse side Q2 of the label.

Similar to the first embodiment of the label, in the second embodiment of the label 2, the pulling element 270 is formed such that the stand-up foot 260 is folded out of the plane of the stand-up part 200 when the pulling element 270 is adhered to a substrate with the adhesive layer 253 and the stand-up part 200 is set up by folding along the stand-up line/fold line 30.

Figure 6:
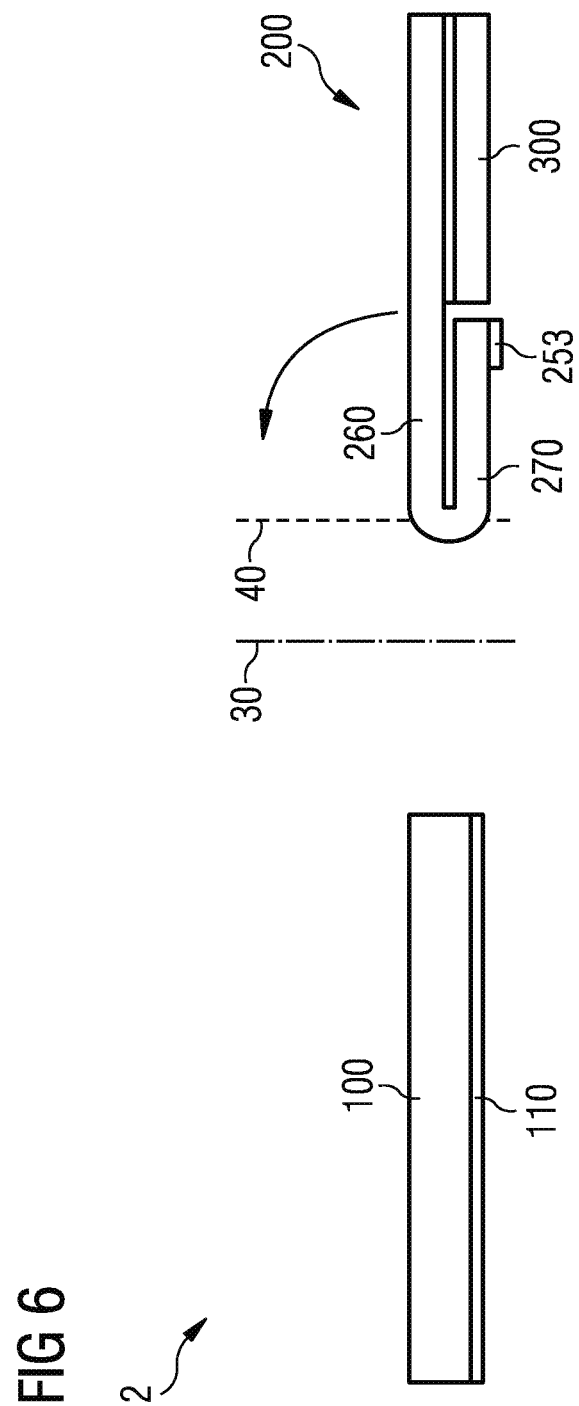
FIG. 6 shows a cross-section of the further embodiment of the label with a stand-up mechanism in the form of a stand-up foot and a pulling element with the pulling element folded down.

In order to activate the stand-up mechanism, the pulling element 270 is first folded over at a crease line 40 onto the underside U200 of the stand-up part 200, as shown in FIG. 6. As a result, the end region 272 with the adhesive layer 253 lies on the underside of the label. When the label 2 is adhered to a substrate, the base part 100 with the adhesive coating 110 and the pulling element 270 with the adhesive layer 253 adhere to the substrate.

When the stand-up part 200 is raised, the pulling element 270 pulls the stand-up foot 260 out of the plane of the stand-up part 200. As a result, the stand-up foot 260 is folded out and supports the stand-up part 200. The two stub feet 281 and 282, which are formed between the punching lines 241 and 243 and 242 and 244 respectively, support the stand-up part 200 on the substrate. In the second embodiment of the label, the stand-up part 200 can also be set up by the stand-up foot 260 either perpendicular to the base part 100, i.e. at an angle of 90° to the base part 100, or at an angle, for example at an angle between 60° and 90°, or over-extended, at an angle between 90° and 120°, to the base part and securely fixed in the stand-up position.

Figure 7:
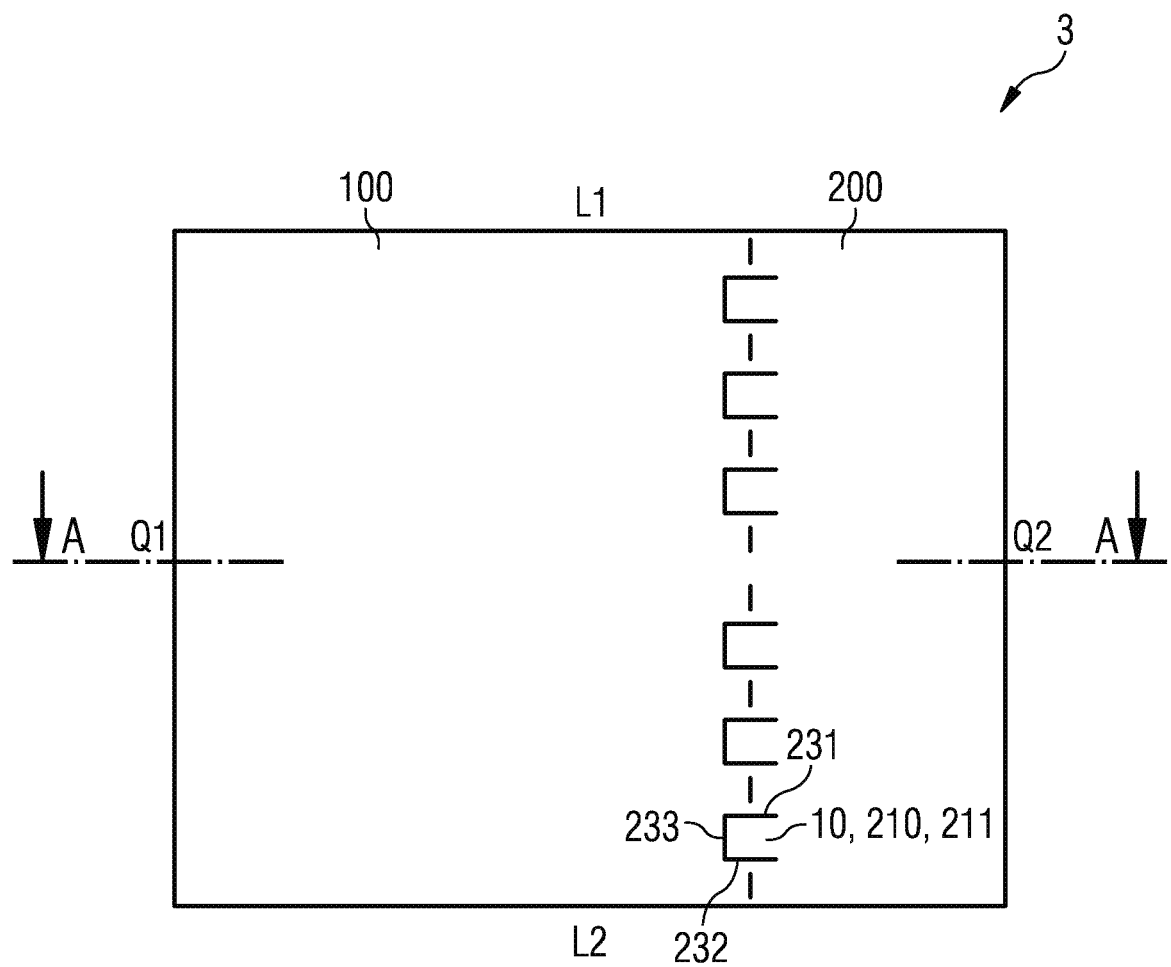
FIG. 7 shows a top view of the upper side of a label with a stand-up mechanism in the form of a stand-up foot without a pulling element in a flat-lying state.
Figure 8:
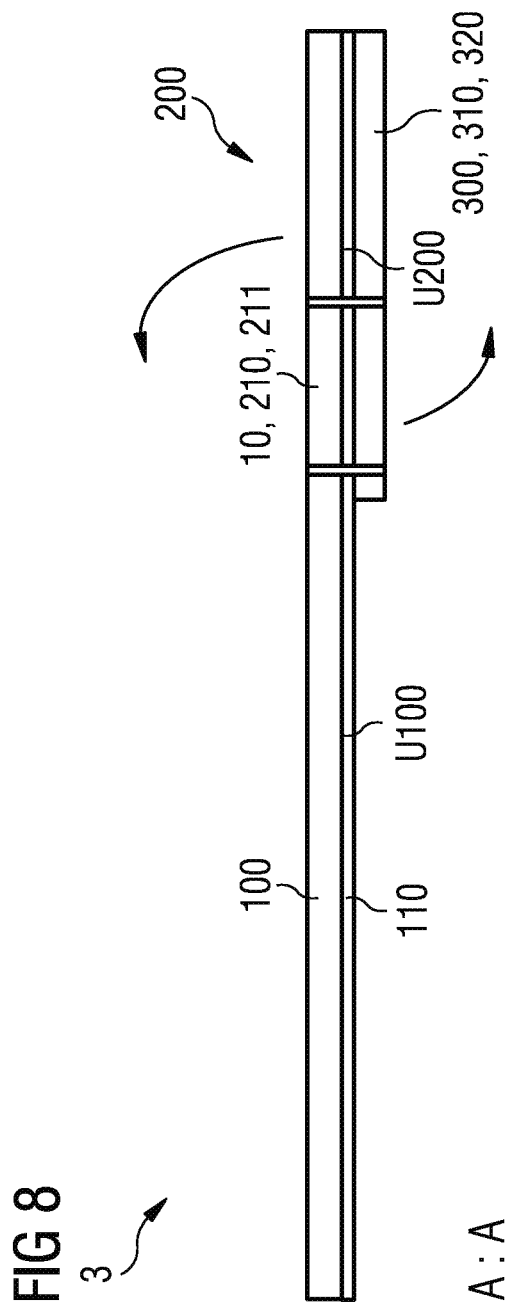
FIG. 8 shows a cross-section of an embodiment of a label with a stand-up mechanism in the form of a stand-up foot without a pulling element in the flat-lying state.
Figure 9:
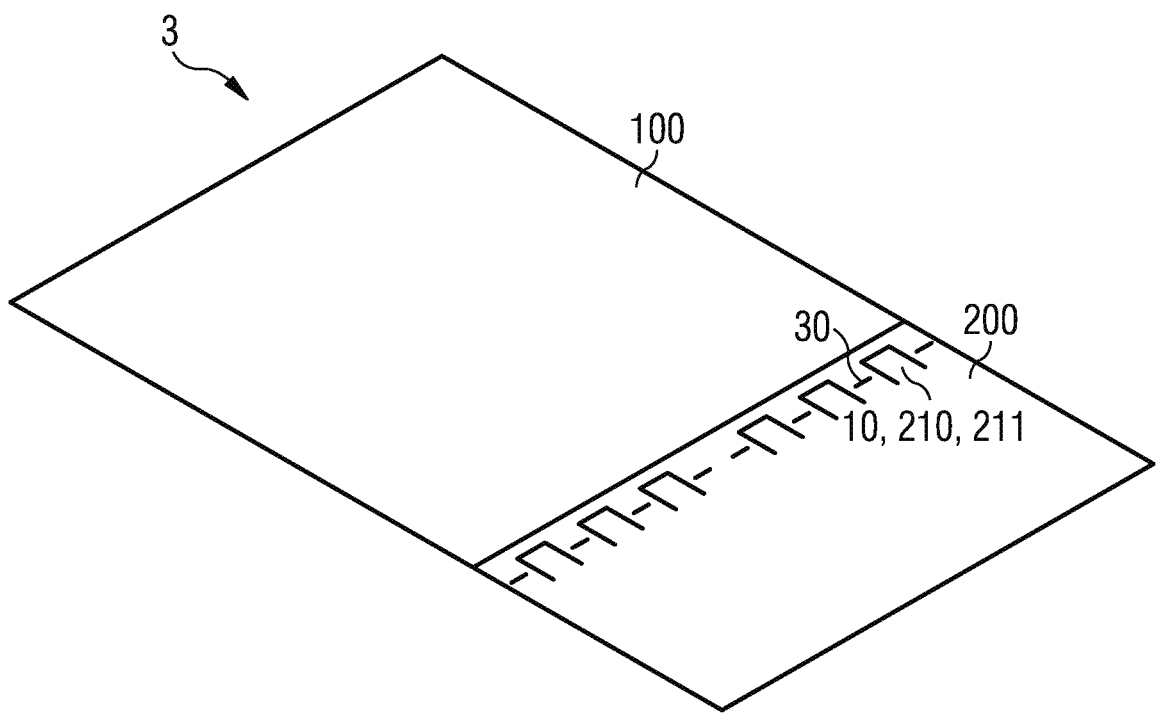
FIG. 9 shows a perspective view of an embodiment of a label with a stand-up mechanism in the form of a stand-up foot without a pulling element in the flat-lying state.

A third embodiment of a label 3 with a stand-up mechanism is described below with reference to FIGS. 7, 8 and 9, wherein FIG. 7 shows a top view onto the upper side of the label 3, FIG. 8 shows a cross-section through the label 3 and FIG. 9 shows a perspective view of the label 3 in flat-lying form.

The label 3 with stand-up mechanism comprises a base part 100, which has an adhesive coating 110 on its underside U100 for adhering the label 3 to a substrate. The label 3 also comprises a stand-up part 200, which is integrally connected to the base part 100. In contrast to the base part 100, the stand-up part 200 is non-adhesive or weakly adhesive on the underside. For example, the underside of the stand-up part 200 may have no adhesive coating or may be coated with an adhesive that is covered by an adhesive killer.

The stand-up part 200 is configured such that the stand-up part can be set up by folding along a stand-up line/fold line 30 at an angle greater than 0° to the base part. The stand-up line/fold line 30 can run parallel to a first transverse side Q1 and a second transverse side Q2 of the label and perpendicular to a first longitudinal side L1 and a second longitudinal side L2 of the label. Other arrangements of the stand-up line/fold line 30 are possible. The stand-up line/fold line 30 is located in an area of the stand-up part 200 that is adjacent to the base part 100. The stand-up line/fold line 30 can be formed as a groove or slit or perforation in the material of the stand-up part in order to enable the stand-up part 200 to be folded/set up.

The stand-up part 200 has a stand-up foot 210 for standing up and aligning the stand-up part 200 at an angle to the base part 100. The stand-up foot 210 is formed from a plurality of support elements/feet 211. The support elements can be formed as punchings in the material of the stand-up foot. Similar to the first embodiment of the label, a first punching line 231, a second punching line 232 spaced therefrom and a third punching line 233 are arranged in the material of the stand-up part 200 to form each of the support elements 211. As can be seen in FIG. 1, the two punching lines 231 and 232 can run parallel to each other and have the same length.

The two punching lines 231 and 232 each extend from the ends of the third punching line 233 into the material of the stand-up part 200. The first and second punching lines 231, 232 can run at a right angle to the third punching line 233. The third punching line 233 can run parallel to the stand-up line/fold line 30. Each support element 211 is thus formed as a region 10 punched out of the material of the stand-up part 200, which is connected to the material of the stand-up part 200 on a side opposite the third punching line 233.

The support elements 211 are arranged along the stand-up line/fold line 30 in such a way that the stand-up line/fold line 30 intersects each support element 211 or each punched-out region 10. The stand-up line/fold line 30 can run as an extension of the third punching line 233 or intersect the punched-out areas at a different point, for example a middle point of the punching lines 231, 232. The positioning of the punched-out regions 10 relative to the stand-up line/fold line 30 and the size or depth of the punching starting from the punching line 233 in the direction of the transverse side Q2 determine the stand-up angle of the stand-up part 200. The stand-up foot is thus formed as a plurality of fold-out tabs in the stand-up part 200, which can be folded out of the stand-up part 200.

The label 3 can be equipped with an RFID function and in this embodiment comprise an RFID inlay 300 having an RFID chip 310 and an antenna 320. The antenna 320 is connected to the RFID chip 310. The RFID chip 310 and in particular the antenna 320 are arranged on the stand-up part 200. As shown in FIG. 8, the RFID inlay 300 can be arranged on the underside U200 of the stand-up part 200.

Figure 10A:
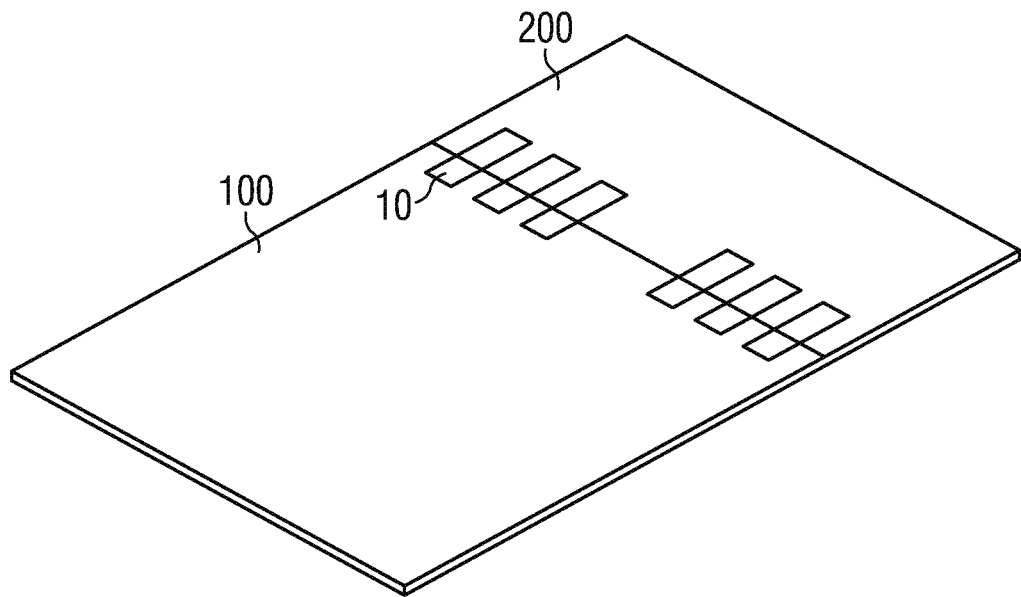
FIGS. 10A to 10D show a stand-up mechanism of the label without a pulling element for setting-up the stand-up part.
Figure 10B:
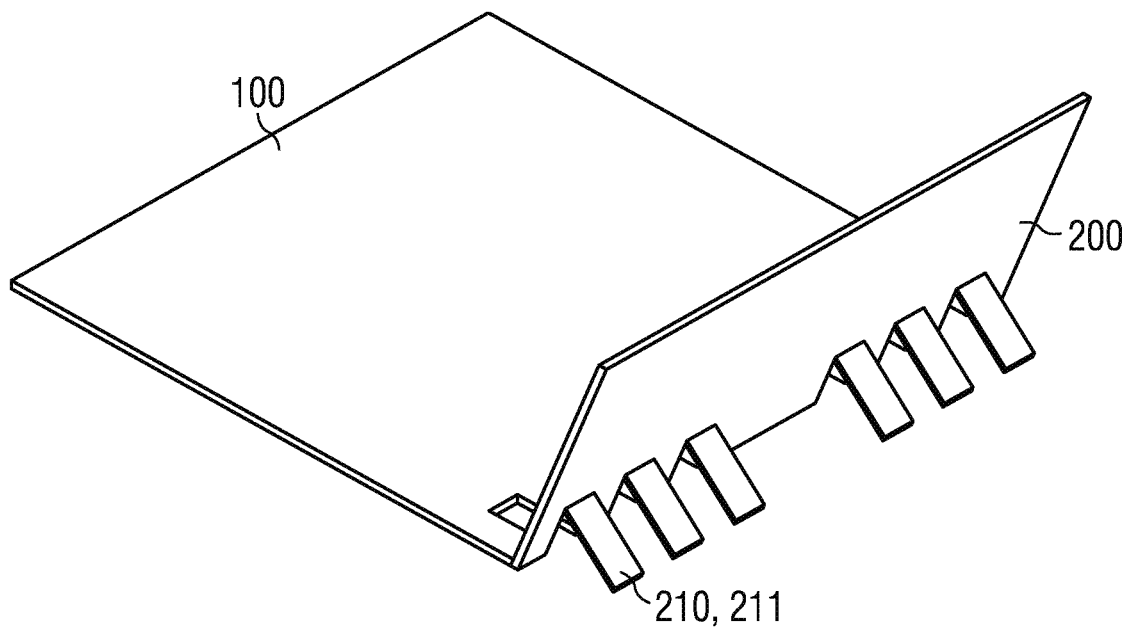
Figure 10C:
Figure 10D:
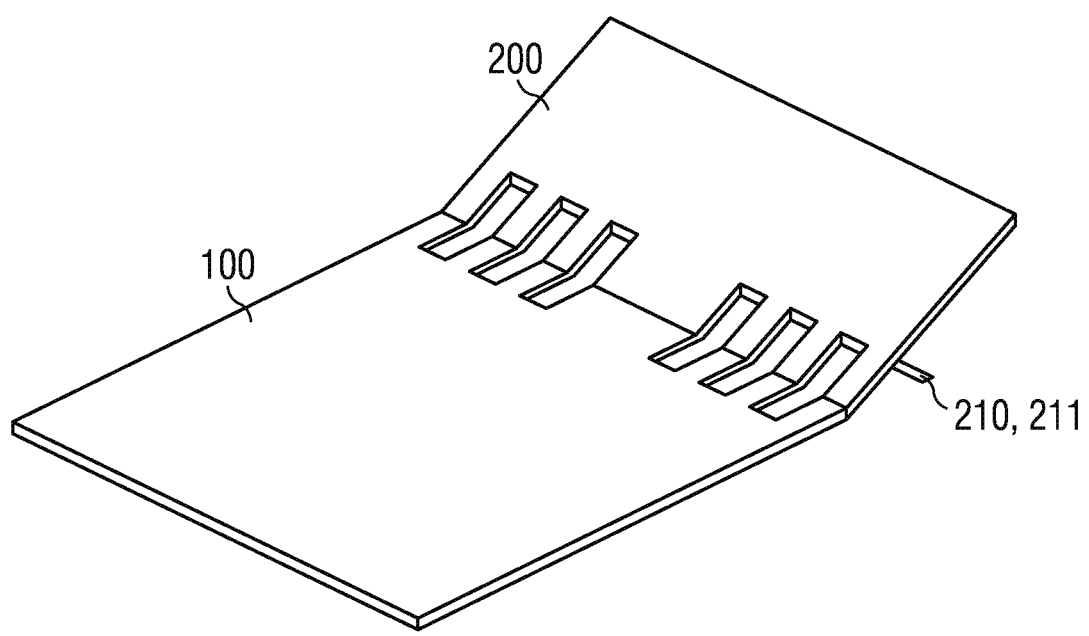

FIGS. 10A to 10D illustrate the stand-up mechanism of the label 3 in order to set up the stand-up part 200 at an angle to the base part 100. FIG. 10A shows the label 3 after the base part 100 with the adhesive coating 110 on the underside has been adhered to a substrate. As shown in the various views of FIGS. 10B-10D, the stand-up part can be folded and set up at the stand-up line or the fold line 30. The support elements 211 are folded out of the plane of the stand-up part 200 when the stand-up part is set up and thus serve to fix the stand-up part at a certain angle to the base part 100 adhered to the substrate. This allows the stand-up part and, in the case of an RFID label, thus also the antenna attached to the stand-up part to be aligned away from the surface.

| List of reference signs | |
|---|---|
| 1 | first embodiment of the label |
| 2 | second embodiment of the label |
| 10 | punched out first region |
| 20 | punched out second region |
| 30 | stand-up line/fold line |
| 40 | crease line of the pulling element |
| 100 | base part |
| 110 | adhesive coating |
| 200 | stand-up part |
| 210 | stand-up foot |
| 220 | pulling element |
| 221, . . . , 223 | sections of the pulling element |
| 231, . . . , 233 | punching lines |
| 241, . . . , 244 | punching lines |
| 251, . . . , 253 | adhesive layer |
| 260 | stand-up foot |
| 270 | pulling element |
| 271, 272 | sections of the pulling element |
| 281, 281 | stub foot |
| 300 | RFID inlay |
| 310 | RFID chip |
| 320 | antenna |

The invention claimed is:

1. A label with stand-up mechanism, comprising:
a base part (100) which has an adhesive coating (110) on its underside (U100) for adhering the label (1, 2) to a substrate, and
a stand-up part (200) which is connected in one piece to the base part (100) and is configured in such a way that the stand-up part can be set up at an angle greater than 0° to the base part by folding along a stand-up line (30),
wherein the stand-up part (200) comprises a stand-up foot (210, 260) for setting up the stand-up part (200) at the angle to the base part (100),
wherein the stand-up foot (210) is formed as a first region (10) punched out of a material of the stand-up part (200), wherein the first region (10) is connected on one side in one piece to the material of the stand-up part (200) so that the stand-up part (200) and the stand-up foot (210, 260) are formed in one piece, and the first region (10) is separated on an opposite side from a material of the base part (100).

2. The label according to claim 1,
wherein the stand-up part (200) has a pulling element (220, 270) for folding out the stand-up foot (210, 260) from a plane of the stand-up part (200).

3. The label according to claim 2, wherein the pulling element (220) is arranged on an underside (U200) of the stand-up part (200).

4. The label according to claim 2, wherein the pulling element (220) has an adhesive layer (251) on a first section (221) on its underside for adhering the pulling element (220) to the substrate.

5. The label according to claim 4,
wherein the pulling element (220, 270) is configured such that the stand-up foot (210, 260) is folded out of the plane of the stand-up part (200) when the pulling element (220, 270) is adhered to the substrate with the adhesive layer (251, 253), and the stand-up part (200) is set up by folding along the stand-up line (30).

6. The label according to claim 2, wherein the pulling element has a further adhesive layer (252) on a second section (222) on its upper side for adhering the pulling element (220) to the stand-up foot (210).

7. The label according to claim 6,
wherein the pulling element (220) has a third section (223) disposed between the first and second sections (221, 222), and
wherein the third section (223) of the pulling element (220) is non-adhesive on the upper side and the underside.

8. The label according to claim 1,
wherein a first punching line (231, 241) and second punching line (232, 242) are arranged in the material of the stand-up part (200),
wherein the stand-up foot (210, 260) is formed in a region of the stand-up part (200) between the first punching line (231, 241) and the second punching line (232, 242),
wherein the first punching line (231, 241) and the second punching line (232, 242) in the material of the stand-up part (200) are arranged at a distance from one another and extend from the stand-up line (30) into the material of the stand-up part (200).

9. The label according to claim 8, wherein the stand-up foot (210) is separated from the material of the base part (100) by a third punching line (233), which runs along a section of the stand-up line (30).

10. The label according to claim 3, further comprising:
a punched-out second region (20), which is arranged in the material of the base part (100),
wherein the punched-out second region (20) has a first longitudinal side (L20a), which extends into the material of the base part (100) in extension of the first punching line (241) starting from the stand-up line (30),
wherein the punched-out second region (20) has a second longitudinal side (L20b), which extends into the material of the base part (100) in extension of the second punching line (242) starting from the stand-up line (30), and
wherein the punched-out second region (20) has a transverse side (Q20) which is arranged at a distance from a transverse side (Q1) of the label.

11. The label according to claim 10,
wherein the stand-up part (200) has a third punching line (243), which extends into the material of the stand-up part (200) starting from the stand-up line (30) and at a distance from the first punching line (241),
wherein the stand-up part (200) has a fourth punching line (244) which extends into the material of the stand-up part (200) starting from the stand-up line (30) and at a distance from the second punching line (242), and
wherein the third and fourth punching lines (243, 244) are arranged at a distance from one another.

12. The label according to claim 11,
wherein the pulling element (270) comprises a first section (271) arranged in the stand-up part (200) between the third and fourth punching lines (243, 244),
wherein the pulling element (270) comprises a second section (272) arranged in the second punched-out region (20) of the base part (100),
wherein the second section (272) of the pulling element (270) has a first longitudinal side (L272a), which extends into the material of the base part (100) in extension of the third punching line (243) starting from the stand-up line (30),
wherein the second section (272) of the pulling element (270) has a second longitudinal side (L272b), which extends into the material of the base part (100) in extension of the fourth punching line (242) starting from the stand-up line (30), and
wherein the second section (272) of the pulling element (270) has a transverse side (Q272) being arranged at a distance from the transverse side (Q20) of the second punched-out region (20).

13. The label according to claim 12, wherein the second section (272) of the pulling element (270) has an adhesive layer (253) at a region on its upper surface for adhering the pulling element (270) to the substrate.

14. The label according to claim 1, further comprising:
a radio frequency identification (RFID) chip (310) and an antenna (320) connected to the RFID chip (310),
wherein the RFID chip (310) and the antenna (320) are arranged on the stand-up part (200).

* * * * *